H. P. WESTCOTT.
VOLUME RECORDING ATTACHMENT FOR FLUID METERS.
APPLICATION FILED APR. 28, 1909.
951,711.
Patented Mar. 8, 1910.
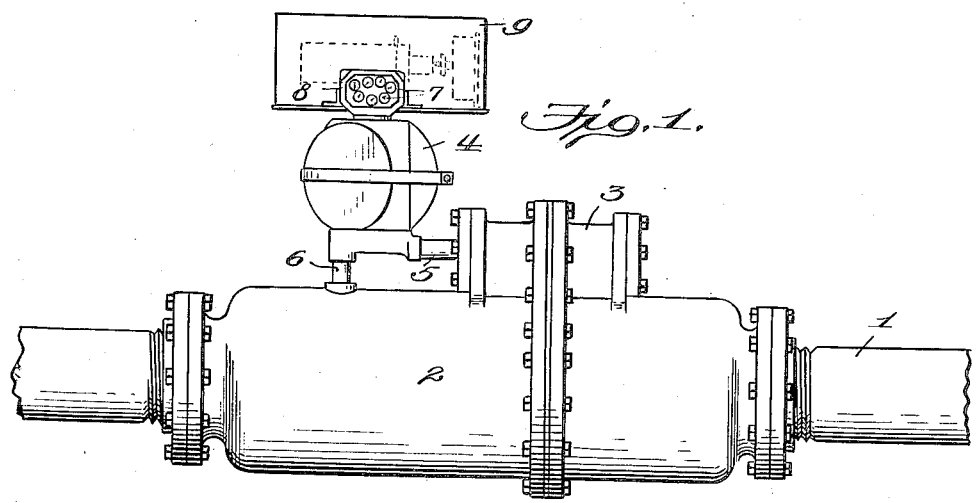
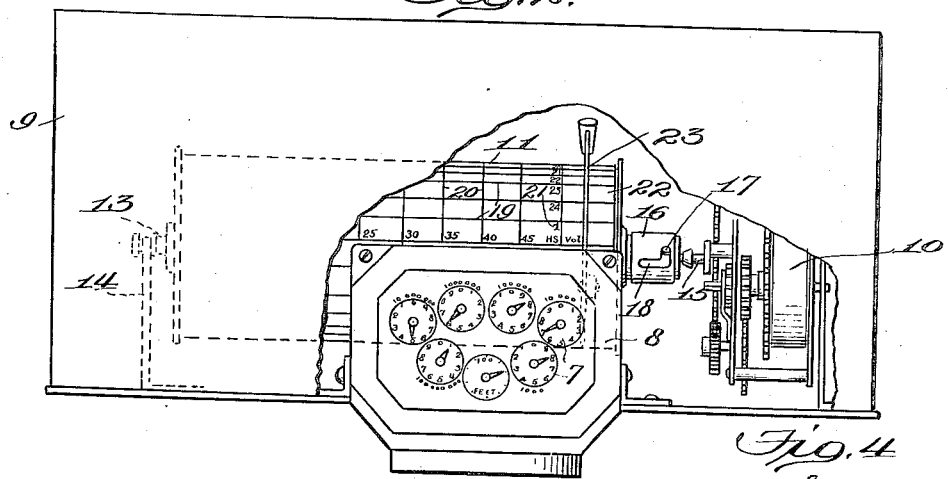
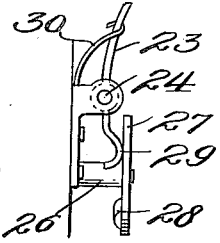
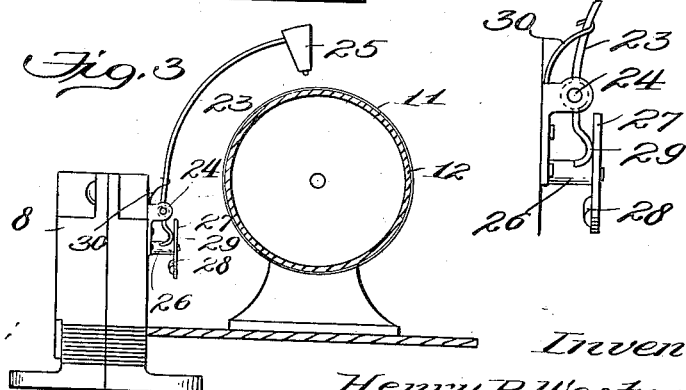
Witnesses:
Inventor
Henry P. Westcott
By James L. Norris

UNITED STATES PATENT OFFICE.

HENRY P. WESTCOTT, OF ERIE, PENNSYLVANIA.

VOLUME-RECORDING ATTACHMENT FOR FLUID-METERS.

951,711.　　　Specification of Letters Patent.　　Patented Mar. 8, 1910.

Application filed April 28, 1909. Serial No. 492,669.

*To all whom it may concern:*

Be it known that I, HENRY P. WESTCOTT, a citizen of the United States, residing at Erie, in the county of Erie and State of Pennsylvania, have invented new and useful Improvements in Volume-Recording Attachments for Fluid-Meters, of which the following is a specification.

This invention relates to new and useful improvements in volume recording attachments for fluid meters and while it is not limited in its use to any particular type of meter, being generally applicable to straight and proportional meters for any kind of fluid, it is of particular advantage and is especially designed for use in connection with proportional meters, by reason of its compendiousness of assemblage and its certain and efficient operation.

The attachment is employed in connection with a suitable chart which is calibrated numerically and also with time indications in order that, in addition to its coöperation with the volume recorder, it may also at the same time be used in connection with a pressure recorder. The latter, of itself, forms no part of the present invention and may be of such suitable or advantageous form as the circumstances of use warrant.

The object of the present invention is to provide a novel combination of parts having for their ultimate purpose inexpensiveness, simplicity of structural details and compendiousness of assemblage.

In the accompanying drawings a preferred and advantageous embodiment of the invention is illustrated, the structural details of which are set forth in the following description, while the novel features by which the invention is distinguished from the prior art will be recited in the claims appended at the end of the description.

In the said drawings: Figure 1 is a side elevation illustrating the application of the improvement to a proportional meter. Fig. 2 is an enlarged front elevation showing the relation of the parts to the meter tally. Fig. 3 is a side elevation thereof, and Fig. 4 is an enlarged detail sectional view showing the pivotal mounting of the marking arm.

Similar characters of reference refer to corresponding parts throughout the several views.

As was previously stated the invention is of especial advantage for use in connection with proportional meters, and it has accordingly been illustrated in this preferred application in the drawings. The disclosure, however, is merely exemplary of a preferred form of the invention which, in so far as I am aware, possesses material breadth of scope.

Referring more particularly to Fig. 1, the numeral 1 indicates a gas main and the numeral 2 indicates the proportioning chamber of such main. Upon the chamber 2 is mounted the casing 3 which contains the proportional valve and its adjunctive mechanism. This valve may be of any desired form and inasmuch as it forms no part of the subject matter of the present invention, its illustration in this application is deemed unnecessary. The casing 3 is connected to the meter box 4, by a pipe, as 5, through which the operating fluid of the determined per cent. is conducted, and a pipe, as 6, connects the box 4 and the chamber 2 and returns the operating fluid to the latter. As will be understood, the mechanism in the casing 4, operates a registering train which forms a part of the tally mechanism, the indicators of which are shown at 7. The tally mechanism is inclosed in a casing, as 8, which is secured upon the top of the box 4 and which projects into a housing, as 9, which incloses the operating parts of the volume recording attachment and which is suitably mounted by attachment to the box 4, as shown in Fig. 1, and to the casing 8, as shown in Fig. 2.

The chart carrier is driven by clock mechanism, as 10, which, in the present embodiment, is mounted at one end of the casing 9. The chart may be of any desired form, either disk shaped, or rectangular and in the use of either, it is simply necessary to alter the position and relation of the clock mechanism. It is preferred, however, to employ a rectangular chart, such as is shown in Figs. 2 and 3, and designated by the numeral 11. In the use of a rectangular chart, the carrier therefor comprises a cylindrical drum, as 12, having at one end a grooved trunnion, as 13, which removably fits in a bearing bracket, as 14, and having its other end supported by and operatively connected to the hour hand shaft, as 15, of the clock mechanism. The connection between the drum and the shaft 15 comprises, essentially, a coupling sleeve, as 16, which fits over a projection on the drum and an enlarged head on the shaft 15, and may be moved axially away from the drum to permit of the disconnection of the drum from said shaft. The sleeve 16 is locked in its operative position by a pin, as 17, which is provided on the head of the shaft and which engages in a bayonet groove, as 18, in the sleeve 16. In disconnecting the drum the sleeve 16 is first given a partial rotation and then an axial movement in the manner described. The chart 11 is divided into squares by a plurality of transverse lines, as 19, and a plurality of circumferential lines, as 20, which intersect the lines 19 at right angles. The spaces between the lines 19 represent intervals of time, as one hour, and the spaces between the lines 20 represent degrees of pressure, as, arbitrarily, multiples of five units of pressure. Each line 19 has at its inner end a designation of some particular hour, such designations increasing successively from "1" to "24" and being shown at 21. Outside of the line of hour designations 21, a circumferential space, as 22, to receive the records of volume, is provided, the lines 19 being continued through the space 22. It will be understood that a new chart is placed upon the drum at intervals of 24 hours and the chart which is removed will have marked thereon in the squares, readings of pressure and in the space 22, readings of volume, for the twenty-four hours next preceding.

The present invention deals more particularly with the combination of a chart having the general characteristics described and a novel means for marking volume records upon such chart. The marking mechanism comprises, essentially, an oscillatory arm, as 23, which is of curved form and overhangs the space 22. The arm 23 is pivoted near its lower end, as at 24, to a lug on the casing 8, and at its upper end is provided with an open ended cone shaped cup, as 25, which contains an absorbent medium saturated with the marking ink, which feeds through the reduced lower end of the cup 25. The marks made by the cup 25 represent units of volume value, as, for example, ten-thousand feet of gas, and accordingly the arm 23 is rocked to make a mark upon the chart after each passage of ten-thousand feet of gas through the main. Toward this end, the shaft which carries the ten-thousands pointer, is extended rearwardly, as shown in Fig. 3, and is designated as 26. Such shaft carries on its rear end, a disk, as 27, which is provided with a projection, as 28, for engagement with the lower end portion of the arm 23 to cause an oscillation thereof. In order that the engagement of the projection 28 may be facilitated, the said lower end portion is of bow shape, as shown at 29, and is pressed at all times into bearing engagement with the disk 27, by a leaf spring, as 30, which has an end secured to the casing 8.

In practical use, the projection 28 engages the end portion 29, at each revolution of the shaft 26 and forces said end portion rearwardly, against the tension of its spring 30, thereby causing the cup 25 to be lowered so as to leave a mark upon the space 22. This mark is of dash-like character and an intermittent record is produced which can be easily summed up by reason of the straight character and absolute alinement of the marks, and the length of the marks, as well as the intervals of space therebetween allow of accurate comparisons between the volume and pressure records.

As far as I am aware, I am the first one to devise an apparatus for use as a volume recording attachment for meters, in which an intermittent record of the type described, is produced. It will be accordingly understood that the novel operating means for the marking arm herein disclosed, is simply exemplary of a preferred embodiment of the inventive idea set forth in the preceding sentence.

Having fully described my invention, I claim:

1. A volume recording attachment for fluid meters attachable to and detachable from the meter as a self contained unit and comprising a casing inclosing the registering train of the meter tally mechanism, a second casing having an opening into which the first casing projects, a chart carrier in the second casing, clock mechanism for operating the chart carrier, a marking arm pivoted in the second casing in operative relation to the chart carrier and an element mounted upon a shaft of the registering train for producing the operative movements of the marking arm.

2. A volume recording attachment for fluid meters attachable to and detachable from the meter as a self contained unit and comprising a casing inclosing the registering train of a tally mechanism, a marking arm pivoted to the casing and means driven by a selected shaft of the registering train for producing the operative movements of the marking arm, a second casing into which the first casing is set, clock mechanism in the second casing and a chart carrier in the second casing, driven by the clock mechanism and which the marking arm overhangs.

3. In a volume recording attachment for fluid meters, in combination, a casing for attachment to the meter box, a registering train, a clock mechanism at one end of the casing, a drum constituting a chart carrier, a bearing supporting the drum at one end, means detachably connecting the drum and the hour hand shaft of the clock mechanism whereby the drum and the shaft rotate together, a pivoted arm overhanging the drum and having means at one end thereof to make a mark upon the chart and means carried by one of the shafts of the registering train for causing an operative pivotal movement of the arm upon each revolution of the shaft.

In testimony whereof I have hereunto set my hand in presence of two subscribing witnesses.

HENRY P. WESTCOTT.

Witnesses:
A. B. GALLAGHER,
J. M. HIRT.